United States Patent [19]

Tatani et al.

[11] 4,108,959

[45] Aug. 22, 1978

[54] PROCESS FOR TREATING A WASTE GAS

[75] Inventors: Atsushi Tatani; Setsuo Omoto; Yoshihiro Shiraishi, all of Hiroshima, Japan

[73] Assignee: Mitsubishi Jukogyo Kabushiki Kaisha, Japan

[21] Appl. No.: 820,383

[22] Filed: Jul. 29, 1977

[30] Foreign Application Priority Data

Aug. 2, 1976 [JP] Japan ................................. 51-91334

[51] Int. Cl.² ............................................. B01D 53/34
[52] U.S. Cl. ..................................... 423/240; 423/242
[58] Field of Search ................ 423/240, 241, 242, 497

[56] References Cited

U.S. PATENT DOCUMENTS 3,876,750  4/1975  Hauser ................................. 423/242

FOREIGN PATENT DOCUMENTS 1,445,228  8/1976  United Kingdom ..................... 423/242

Primary Examiner—Earl C. Thomas
Attorney, Agent, or Firm—Wenderoth, Lind & Ponack

[57] ABSTRACT

A process for treating a waste gas containing $SO_2$ and HCl which comprises determining the amount of HCl in said waste gas and supplying at least one magnesium salt selected from the group consisting of $MgSO_4$, $MgSO_3$, $MgO$, $MgCO_3$ and $Mg(HSO_3)_2$ in an amount corresponding to the amount of HCl additionally supplying $CaCO_3$ or $Ca(OH)_2$ as an absorbent for $SO_2$ to a column for treating said waste gas.

7 Claims, 1 Drawing Figure

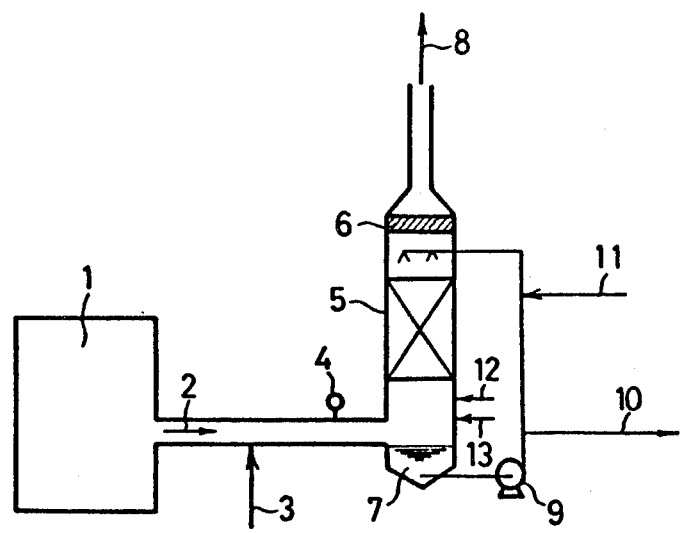

PROCESS FOR TREATING A WASTE GAS

The present invention relates to a process for treating a waste gas. More particularly, the present invention relates to a process for treating a waste gas especially containing $SO_2$ and HCl.

In practicing a process for desulfurizing a waste gas by a generally known lime gypsum method, in said waste gas, besides $SO_2$ as a harmful component, HCl as an impurity is contained in many cases. In the case of treating a waste gas using $CaCO_3$ or $Ca(OH)_2$ as an absorbent for $SO_2$, the following reactions are brought about.

$$Ca(OH)_2 + SO_2 \rightarrow CaSO_3 + H_2O \tag{1}$$

$$CaCO_3 + SO_2 \rightarrow CaSO_3 + CO_2 \tag{2}$$

$$Ca(OH)_2 + 2HCl \rightarrow CaCl_2 + 2H_2O \tag{3}$$

$$CaCO_3 + 2HCl \rightarrow CaCl_2 + H_2O + CO_2 \tag{4}$$

Further, inside an absorption column, the following oxidation reaction is also brought about.

$$CaSO_3 + \tfrac{1}{2}O_2 \rightarrow CaSO_4 \tag{5}$$

We, the present inventors have confirmed that $CaCl_2$ produced by the reactions (3) and (4) of the aforementioned reactions not only remarkably obstruct the desulfurization performance, but also remarkably promote the adhesion and growth of $CaSO_4$ produced by the reaction (5) as gypsum scale inside an absorption column and obstructs driving of a waste gas treating apparatus. Namely, HCl in the waste gas is collected as $CaCl_2$ by $CaCO_3$ or $Ca(OH)_2$ which is an absorbent. On the other hand, $SO_2$ is removed from the system as gypsum produced as a by-product. Upon separation of gypsum by filtration, there remains a filtrate in which $CaCl_2$ is readily soluble. Since almost all of the filtrate is circulated as an absorbent adjusting liquid, $CaCl_2$ is accumulated as a circulating slurry in the absorption column and in consequence, brings about the aforesaid adverse effect.

We, the present inventors, conducted strenuous studies with reference to a process for preventing such adverse effect of $CaCl_2$, and have found that as a result of fixing chlorides including HCl as $MgCl_2$, the aforesaid adverse effect could be prevented. On the basis of such discovery the present invention has evolved.

Namely, the present invention provides an entirely novel process with the capability of preventing growth of scale. The steps of this process comprise: determining the amount of HCl contained in a waste gas, supplying a magnesium salt in an amount corresponding to the amount of HCl to a column for treating the waste gas and causing all chlorides in a circulating slurry in said column for treating the waste gas to exist as $MgCl_2$.

On the contrary, when an Mg compound in an amount in excess of the amount of HCl is supplied, the excess Mg compound causes the following reaction to promote the growth of scale on the contrary. Therefore, it is important to make the added amount of the Mg compound equivalent to the amount of HCl.

$$MgSO_4 + Ca(HSO_3)_2 \rightarrow CaSO_4 \downarrow + Mg(HSO_3)_2$$

The magnesium salt is selected from the group consisting of $MgSO_4$, $MgSO_3$, MgO, $MgCO_3$ and $Mg(HSO_3)_2$ in an amount corresponding to the amount of HCl and $CaCO_3$ or $Ca(OH)_2$ as an absorbent for $SO_2$ to a column for treating said waste gas.

The present invention takes advantage of the fact that by causing all of the chlorides in the circulating slurry to exist as $MgCl_2$, it is possible to prevent drawbacks such as aggravation of the desulfurization performance and promotion of the growth of gypsum scale. One of the reasons therefor is considered to be due to the function of $MgCl_2$ to increase the solubility of $CaSO_4$ (in contrast thereto, $CaCl_2$ has a function of decreasing the solubility of $CaSO_4$). A second reason is, when $MgCl_2$ is contained in a circulating slurry in the absorption column, the partial pressure of $SO_2$ is lowered, in consequence of which the desulfurization efficiency rises (in contrast thereto, when $CaCl_2$ is contained in the circulating liquid, the partial pressure of $SO_2$ in the absorption column rises).

In practicing the present invention, the amounts of HCl and $SO_2$ in the waste gas are determined, the pH of the circulating slurry in the absorption column is kept at a value below 10, at least one magnesium salt selected from the group consisting of $MgSO_4$, $MgSO_3$, MgO, $MgCO_3$ and $Mg(HSO_3)_2$ is added, and the correlation of the concentration of $[Mg^{++}]$ and the concentration of $[Cl^-]$ in the circulating slurry in the absorption column is based on the following formula (6)

$$[Mg^{++}] = \frac{[Cl^-]}{2} \tag{6}$$

so that all the $CaCl_2$ may be converted into $MgCl_2$ by the following formula (7)

$$CaCl_2 + Mg.X \rightarrow MgCl_2 + CaX \tag{7}$$

(wherein X stands for $SO_4$, $SO_3$, O, $CO_3$ or $(HSO_3)_2$).

The data for examples of the present invention and a comparative example, as shown below, are obtained by the pilot plant shown in the accompanying drawing. The drawing will be explained first.

BRIEF DESCRIPTION OF THE DRAWING

The drawing is a flow sheet of an apparatus wherein the examples of the present invention and a comparative example are performed.

To a waste gas coming from a heavy oil-burning boiler 1, to a flue 2 HCl gas is added from a line 3. By an $SO_2$ and HCl concentration determining device 4, the amounts of $SO_2$ and HCl flowing into an absorption column 5 are determined and $MgSO_4$, in an amount corresponding to the amount of incoming HCl, is added from a line 12 to the absorption column 5. At the same time, a $CaCO_3$ or $Ca(OH)_2$ absorbent in an amount corresponding to the amount of incoming $SO_2$ is added from a line 13 to the absorption column 5. A slurry in a tank 7 of the absorption column is circulated inside the absorption column 5 by a pump 9 and feed water is added from a line 11 to adjust the slurry concentration. The absorbent added for absorbing $SO_2$ and HCl, and $MgSO_4$ accumulates in the tank 7 of the absorption column; therefore, in order to keep the concentrations of the two at constant values, a part of the circulating slurry in the absorption column is extracted from a line 10 to the outside of the system.

On the other hand, a purified gas is discharged to the outside of the system from a line 8 after passing through a demister 6.

COMPARATIVE EXAMPLE

This example is directed to a conventional process not employing $Mg^{++}$. The operating conditions therefor are shown in Table 1.

Table 1

| Operating conditions of the pilot plant | |
| --- | --- |
| Absorbent | $Ca(OH)_2$ |
| Treated gas flowing amount | 2000 $Nm^3/H$ |
| Gas temperature at the entrance of the absorption column | 145° C |
| $SO_2$ concentration " | 1300 ppm |
| HCl concentration " | 200 ppm |
| $O_2$ concentration " | 5 vol% |
| Liquid/gas ratio in the absorption column | 7 liters/$Nm^3$ |

The concentration of the slurry circulating in the absorption column and the composition of a discharged gas at the exit of the absorption column in a stationary state are shown in Table 2 and Table 3, respectively.

Table 2

| Composition of the slurry circulating in the absorption column | |
| --- | --- |
| $CaSO_3 \cdot \frac{1}{2}H_2O$ | 0.598 mol/liter |
| $CaSO_4 \cdot 2H_2O$ | 0.227 mol/liter |
| $CaCl_2$ | 0.083 mol/liter |
| $CaCO_3$ | 0.075 mol/liter |
| pH | 7.0 |

Table 3

| Composition of the gas at the exit of the absorption column | |
| --- | --- |
| $SO_2$ concentration at the exit of the absorption column | 310 ppm |
| HCl concentration " | 4 ppm |

After running this test for 200 consecutive hours, pillarlike scales of gypsum grew on the packed material and spray nozzle of the absorption column.

EXAMPLE 1

Next, the results of a test system wherein $Mg^{++}$ coexists which is a process of the present invention will be shown.

As an absorbent, $Ca(OH)_2$ was used (the same as in the Comparative Example) and $MgSO_4$ was separately supplied to the tank of the absorption column. The supplied amount of $MgSO_4$ was so adjusted as to make it equivalent to the amount of HCl gas supplied to a waste gas of a heavy oil-burning boiler.

Except for supplying $MgSO_4$, the test conditions were the same as in Table 1.

The composition of the slurry circulating in the absorption column and the composition of the gas at the exit of the absorption column in a stationary state are shown in Table 4 and Table 5, respectively. All the chlorides exist as $MgCl_2$.

Table 4

| Composition of the circulating slurry in the absorption column | |
| --- | --- |
| $CaSO_3 \cdot \frac{1}{2}H_2O$ | 0.572 mol/liter |
| $CaSO_4 \cdot 2H_2O$ | 0.335 mol/liter |
| $CaCO_3$ | 0.072 mol/liter |
| $MgCl_2$ | 0.070 mol/liter |
| pH | 7.0 |

Table 5

| Composition of the gas at the exit of the absorption column | |
| --- | --- |
| $SO_2$ concentration at the exit of the absorption column | 100 ppm |
| HCl concentration " | 3 ppm |

It is seen that in comparison with the Comparative Example, wherein $CaCl_2$ is present, the desulfurization performance advances.

At a time immediately after performing this test for 240 consecutive hours, scale did not grow at all and a remarkable difference from the Comparative Example was recognized.

EXAMPLE 2

A test was carried out under the same conditions as in Example 1 except for adding $MgSO_3$ instead of $MgSO_4$. As a result, all of the chlorides were present as $MgCl_2$ in the slurry circulating in the absorption column and there was no adverse effect like that seen in the Comparative Example, wherein $CaCl_2$ was present.

EXAMPLE 3

Tests were carried out under the same conditions as in Example 1 except for using MgO, $MgCO_3$ and $Mg(HSO_3)_2$, respectively instead of $MgSO_4$. The results were the same as in Example 2.

EXAMPLE 4

A test was carried out under the same conditions as in Example 1 except for mixing $MgSO_4$ to be supplied to the tank of the absorption column with $Ca(OH)_2$ in advance, before the former was supplied to the tank of the absorption column.

In a slurry obtained by mixing $Ca(OH)_2$ with $MgSO_4$ in advance, $CaSO_4 \cdot 2H_2O$, was present and became a seed crystal for $CaSO_4$ produced by oxidation in the absorption column, making larger gypsum crystals in the slurry extracted from the absorption column than that in Example 1, to say nothing of preventing scale.

EXAMPLE 5

A test was carried out under the same conditions as in Example 1 except for using $CaCO_3$ instead of $Ca(OH)_2$ used in Example 1.

Tests were performed while varying the pH of the slurry in the absorption column from 0.50 to 6.2, however, formation of scale was not observed.

EXAMPLE 6

Tests were carried out under the same conditions as in Example 1 except for varying the concentration of the calcium compound in the slurry of the absorption column from 0.5 mol/liter to 1.5 mol/liter, however, formation of scale was not observed.

EXAMPLE 7

Tests were carried out under the same conditions as in Example 1 except for varying the liquid/gas ratio in the absorption column in Example 1 of 7 liter/$Nm^3$ to 10 liter/$Nm^3$, 15 liter/$Nm^3$, 20 liter/$Nm^3$, 30 liter/$Nm^3$ and 50 liter/$Nm^3$, respectively. At times immediately after driving the tests for 100 consecutive hours, respectively, scale did not grow at all the same as in Example 1 and remarkable differences from Comparative Example were recognized. As the liquid/gas ratio increased, the desulfurization ratio in the absorption column advanced, and when the liquid/gas ratio was 50 liter/$Nm^3$, $SO_2$ and HCl at the exit of the absorption column were not detected.

What is claimed is:

1. A process for treating a waste gas containing $SO_2$ and HCl which comprises determining the amount of HCl in said waste gas and supplying at least one magnesium salt selected from the group consisting of $MgSO_4$, $MgSO_3$, MgO, $MgCO_3$ and $Mg(HSO_3)_2$ in an amount corresponding to the amount of HCl, and additionally supplying $CaCO_3$ or $Ca(OH)_2$ as an absorbent for $SO_2$ to a column for treating said waste gas.

2. A wet process for treating a waste gas containing $SO_2$ and HCl with a wet lime method which comprises determining the amount of HCl contained in said waste gas to be supplied to a column for treating the waste gas, supplying at least one magnesium salt selected from the group consisting of $MgSO_4$, $MgSO_3$, MgO, $MgCO_3$ and $Mg(HSO_3)_2$ in an amount corresponding to the amount of HCl to the column for treating the waste gas, determining the amount of $SO_2$ contained in the waste gas to be supplied to said column for treating the waste gas and supplying $CaCO_3$ or $Ca(OH)_2$ in an amount corresponding to the amount of $SO_2$, to said column for treating the waste gas.

3. A process according to claim 1, wherein $CaSO_4\cdot 2H_2O$ is additionally supplied to said column for treating the waste gas.

4. A process according to claim 1, wherein there is present an absorbant slurry sprayed in circulation in said column for treating the waste gas and wherein the ratio of said slurry to said waste gas is at least 7 liter/$Nm^3$.

5. A process according to claim 1, wherein the pH of an absorbing slurry in circulation in said column for treating the waste gas is 5.0 – 7.0.

6. A process according to claim 1, wherein the concentration of a calcium compound of an absorbing slurry in circulation in said column for treating the waste gas is maintained at a value within the range of from 0.5 mol/liter to 1.5 mol/liter.

7. A process according to claim 1, wherein a slurry obtained by mixing in advance said magnesium salt with said calcium salt is supplied to said column for treating the waste gas.

* * * * *